United States Patent

[11] 3,571,696

| [72] | Inventors | Manfred Liska;<br>Aubert Martin, Munich, Germany |
|---|---|---|
| [21] | Appl. No. | 877,660 |
| [22] | Filed | Dec. 18, 1969 |
| [45] | Patented | Mar. 23, 1971 |
| [73] | Assignee | Siemens Aktiengesellschaft<br>Berlin, Germany |
| [32] | Priority | Dec. 25, 1968 |
| [33] | | Germany |
| [31] | | P 18 10 760.3 |

[54] ALTERNATING CURRENT CONTROLLER WITH START-UP DELAY
3 Claims, 5 Drawing Figs.

[52] U.S. Cl. .................................... 323/22,
307/301, 323/24, 323/36
[51] Int. Cl. ........................................ G05f 1/40,
G05f 1/52, G05f 1/60
[50] Field of Search............................. 307/301;
323/22 (SCR), 24, 36, 41, (Inquired)

[56] References Cited
UNITED STATES PATENTS

| 3,307,093 | 2/1967 | Wright.................. 323/22SCRUX |
| 3,377,542 | 4/1968 | Glorioso................... 323/22 |
| 3,470,458 | 9/1969 | Corey....................... 323/22 |
| 3,495,154 | 2/1970 | Dosh et al................. 323/22X |
| 3,501,771 | 3/1970 | Miller et al................ 323/22 |

*Primary Examiner*—William H. Beha, Jr.
*Attorneys*—Curt M. Avery, Arthur E. Wilfond, Herbert L. Lerner and Daniel J. Tick

ABSTRACT: An AC controller connects a load to an AC voltage source and has a control unit for providing output control pulses in synchronism with the voltage of the source. An RC circuit connected to the control unit has a load capacitor and a load resistor for controlling the phase position of the control pulses in accordance with the time constant of the RC circuit.

LOAD CURRENT

VOLTAGE

LOAD CURRENT

VOLTAGE

ALTERNATING CURRENT CONTROLLER WITH START-UP DELAY

DESCRIPTION OF THE INVENTION

The invention relates to an alternating current controller with start-up delay. More particularly, the invention relates to an alternating current controller for connecting a load to an AC voltage source and for controlling the phase position of control pulses.

An alternating current controller comprises a control member which connects a load to an AC voltage source. The control member comprises a control unit which provides output control pulses in synchronism with the alternating voltage produced by the AC voltage source. The phase position of the control pulses depends upon the variable time constant of an RC circuit which comprises a load capacitor and a load resistor connected in series with each other. A variable portion of a voltage divider is connected in parallel with the load capacitor via a first diode.

In many cases, it is desired that the phase angle of the control pulses provided by the control unit should not assume the adjusted datum value immediately after activation of the circuit. It is preferred, rather, that the datum value be reached by the firing pulses during the course of a rather brief transition period, issuing from a very large firing angle at a low load current. This condition is especially preferred when the load resistance is very low at the commencement of operation of the circuit and increases to its stationary value during the course of operation, as in lighting installations, for example.

German Pat. No. 1,168,555 discloses an alternating current controller comprising a control unit which provides control pulses which reach their predetermined magnitude gradually, with the assistance of a datum value transformer. This is achieved by a capacitor which is connected to a DC voltage source when the circuit is actuated. The rapidity of charging of the capacitor determines the shifting of the control pulses from a very large phase angle to the adjusted phase angle.

The circuit arrangement disclosed by the German patent has the disadvantage that the phase angle of the control pulses is delayed, not only after the circuit is actuated, but also during an intentional variation of the datum value of the phase angle. Another disadvantage of the circuit arrangement disclosed by the German patent is that a variation of the control pulses, which does not depend upon the adjusted datum value, always occurs only after the operating voltage is applied to the circuit. On the other hand, this does not insure that a load resistance such as, for example, a lamp connected in the load circuit, if exchanged, will cause the current to gradually increase to the previously adjusted datum value, unless the current supply to the control unit is previously interrupted for a brief period of time.

The principal object of the invention is to provide a new and improved AC controller for connecting a load to AC voltage source.

An object of the invention is to provide an AC controller which provides a substantially nondelayed control of the current of a load during normal operation, and at the same time provides a delayed start-up after each interruption of the load current circuit.

An object of the invention is to provide an AC controller which controls a load with efficiency, effectiveness and reliability.

In accordance with out invention, an AC controller for connecting a load to an AC voltage source has a control unit for providing output control pulses in synchronism with the voltage of the AC source. A resistance capacitance circuit connected to the control unit has a load capacitor and a load resistor connected in series circuit arrangement for controlling the phase position of the control pulses in accordance with the time constant of the resistance capacitance circuit. The AC controller comprises a first diode, a second diode and a transistor having emitter, collector and base electrodes, an emitter-collector path, a base-emitter control path and a base-collector path. A voltage divider has a variable portion connected in parallel with the load capacitor via the first diode and is connected to the emitter-control path of the transistor via the second diode. The first and second diodes have polarities which are such that the current may flow from the voltage divider to the load capacitor and to the transistor. The AC controller further comprises a resistor, a DC voltage source and a third decoupling diode having a forward conducting polarity connected in series with the resistor between the DC voltage source and the control path of the transistor for providing the control current of the transistor. The resistor has a resistance value which is such that when the DC voltage source is connected in the circuit the transistor is fully controlled. The load resistor has a resistance value which is such that a phase shift between the control pulses and the zero passages of the alternating voltage of the AC voltage source has a maximum magnitude independent of the adjustment of the voltage divider. The AC controller further comprises a Zener diode. A storage capacitor is connected in series circuit arrangement with the Zener diode. The series circuit arrangement is connected in parallel with the third diode and with the control path of the transistor. A current transformer has a primary winding coupled between a load and the AC voltage source and a secondary winding. A rectifier couples the storage capacitor to the secondary winding of the current transformer. The rectifier of the Zener diode has polarities which are such and the Zener diode is so rated that the control current supplied by the DC voltage source to the transistor decreases when a specific magnitude of the alternating current flowing through the load is exceeded.

An additional capacitor is connected in parallel with the base-collector path of the transistor. An additional rectifier is coupled to the secondary winding of the current transformer. An additional decoupling diode and a threshold member couple the control path of the transistor to the additional rectifier. The rectifier has polarities which are such that it provides a current through the control path of the transistor when the current through the load exceeds a threshold level determined by the threshold member.

In order that the invention may be readily carried into effect, it will now be described with reference to the accompanying drawing, wherein.

Figure 1:
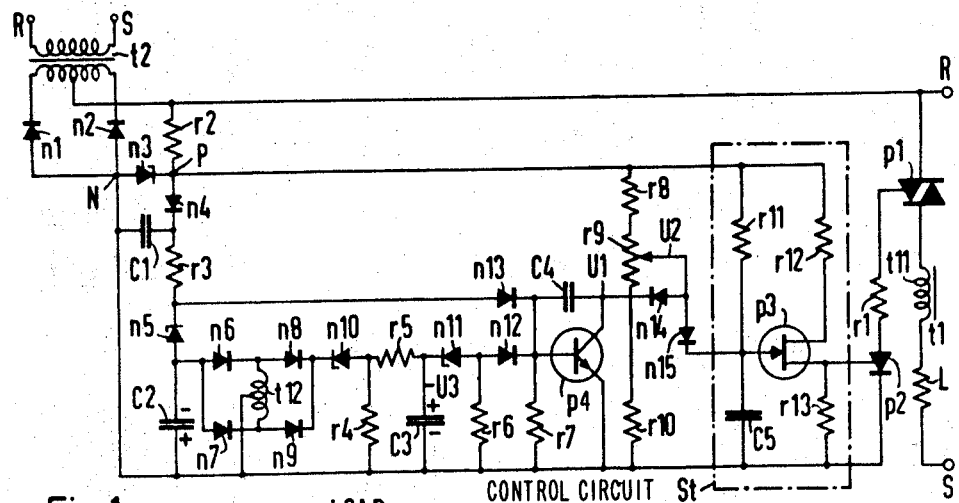
FIG. 1 is a circuit diagram of an embodiment of the AC controller of the invention.

In FIG. 1, the load circuit includes a semiconductor component $p1$, the primary winding $t11$ of a current transformer $t1$ and a load L, connected to each other in series circuit arrangement between terminals R and S of a source of alternating voltage. The semiconductor component $p1$ is a Triac, which may be switched independently of the polarity of the applied voltage. A Triac is a pair of semiconductor controlled rectifiers connected in back to back relation and is described on pages 9 to 14 of the SCR Manual, Fourth Edition, General Electric Company, 1967, Syracuse, N.Y. The load L may comprise, for example, an incandescent lamp.

The control pulses for the Triac are provided by a control circuit $St$ of known structure. The control circuit includes a double base diode $p3$ having base terminals, one of which is connected to the positive polarity terminal P of a DC voltage source via a resistor $r13$ and the other of which is connected to the negative polarity terminal N of said DC voltage source via a resistor $r12$. A voltage divider connected to the DC voltage source comprises a load capacitor C5 and a resistor $r11$ connected in series circuit arrangement between the positive and negative polarity terminals P and N of said DC voltage source.

The tap point of the voltage divider C5, $r11$ is directly connected to the emitter electrode of the double base diode $p3$.

A thyristor *p*2 has an anode connected to the control grid of the Triac *p*1 via a resistor *r*1. The control circuit or control grid-cathode path of the thyristor *p*2 is connected in parallel with the resistor *r*13. The control circuit for the Triac *p*1 extends from the control electrode of said Triac to a terminal of a rectifier comprising a pair of diodes *n*1 and *n*2 via the resistor *r*1 and the anode-cathode path of the thyristor *p*2. The other terminal of the rectifier is connected, in the return path, to the Triac *p*1 via the center tap point of the secondary winding of a transformer *t*2. The transformer *t*2 has a primary winding connected to the AC voltage source R, S. The rectifier *n*1, *n*2 functions, together with a resistor *r*2 and a Zener diode *n*3, as the aforedescribed DC voltage source which energizes the control circuit S*t*.

A voltage divider comprising resistors *r*8, *r*9 and *r*10, all of which are connected in series circuit arrangement, is connected between the positive and negative polarity terminals P and N of the DC voltage source. The resistor *r*9 of the voltage divider *r*8, *r*9, *r*10 is a potentiometer having a variable electrode or tap point which is connected to the emitter electrode of the double base diode *p*3 via a decoupling diode *n*15.

A transistor *p*4 has emitter, collector and base electrodes, an emitter-collector path, an emitter-base path and a collector-base path. A decoupling diode *n*14 is connected in series circuit arrangement with the emitter-collector path of the transistor *p*4. The series circuit arrangement of the decoupling diode *n*14 and the emitter-collector path of the transistor *p*4 is connected in parallel with a diode *n*15 and the load capacitor C5. The base electrode of the transistor *p*4 is connected to the tap point of a voltage divider comprising a capacitor C4 and a resistor *r*7. The voltage divider C4, *r*7 is connected between the collector and emitter electrodes of the transistor *p*4. The base electrode of the transistor *p*4 is connected to the positive polarity terminal P of the DC voltage source via a decoupling diode *n*13, a resistor *r*3 connected in series with said decoupling diode and the diode *n*4. The base electrode of the transistor *p*4 is connected to the negative polarity terminal N of the DC voltage source via the resistor *r*7.

A Zener diode *n*5 is connected in series circuit arrangement with a storage capacitor C2. The series circuit arrangement *n*5, C2 is connected in parallel with the series circuit arrangement of the diode *n*13 and the emitter-base path of the transistor *p*4. The series circuit arrangement *n*5, C2 is connected to a rectifier comprising a pair of diodes *n*6 and *n*7. The diodes *n*6 and *n*7 are connected in series across the secondary winding *t*12 of the current transformer *t*1. The secondary winding *t*12 of the current transformer *t*1 has a center tap connected to the negative polarity terminal N of the DC voltage source. The rectifier *n*6, *n*7 is connected with a polarity which is such that the storage capacitor C2 is charged to the indicated polarity.

The secondary winding *t*12 of the current transformer *t*1 is connected across a rectifier comprising a pair of diodes *n*8 and *n*9 connected in series with each other. The rectifier *n*8, *n*9 energizes a resistor *r*4 via a Zener diode *n*10. A resistor *r*5 and a capacitor C3 are connected in series circuit arrangement with each other and said series circuit arrangement is connected in parallel with the resistor *r*4. The capacitor C3 is coupled to a resistor *r*6 via a Zener diode *n*11. The resistor *r*6 is connected in parallel with the emitter-base path of the transistor *p*4 via a decoupling diode *n*12. The polarities of the diodes and the Zener diodes are shown in FIG. 1.

The connection between the collector electrode of the transistor *p*4 and the diode *n*14 is interrupted after the alternating voltage of the AC voltage source is applied to the terminals R and S. The voltage between the terminals P and N of the DC voltage source then increases to a value determined by the Zener diode *n*3. The load capacitor C5 is charged, against the voltage, via the load resistor *r*11. When the voltage applied thereto, and also to the emitter electrode of the double base diode *p*3, reaches a specified fraction of the voltage between the terminals P and N, determined by the structure of the double base diode and the resistance values of the resistors *r*12 and *r*13, the path between the emitter and lower base electrodes of said double base diode decreases in resistance. The load capacitor C5 then discharges via the resistor *r*13 and the control path of the thyristor *p*2 which is connected in parallel therewith. The thyristor *p*2 is thus switched to its conductive condition and the rectifier *n*1, *n*2 conducts a firing current via the Triac *p*1, the resistor *r*1 and the thyristor *p*2. As a result, a load current flows up to the end of the half wave, via the current transformer *t*1 and the load L.

At the end of the half wave, the voltage between the positive and negative polarity terminals P and N of the DC voltage source becomes zero for a brief period of time and the double base diode *p*3 is switched to a nonconductive or blocking condition. Shortly thereafter, the load capacitor C5 is recharged against the constant current between the terminals P and N.

The time constant of the RC circuit comprising the load resistor *r*11 and the load capacitor C5 is so selected that the double base diode *p*3, and therefore the thyristor *p*2 as well as the Triac *p*1, fire only shortly before the end of each half wave, which corresponds to a very large phase angle and a very low load current.

The circuit arrangement functions in a different manner, if the switching component, in accordance with our invention, is coupled to the voltage divider *r*8, *r*9, *r*10 via the diode *n*14. The charging period, that is the switching period of the load capacitor C5, is also determined by the tap point of the potentiometer *r*9, up to the magnitude required for the firing of the double base diode *p*3. The voltage U2 which is tapped from the potentiometer *r*9 cannot influence the charging process for the time being, since the transistor *p*4 is supplied with a current via the diode *n*4, the resistor *r*3 and the diode *n*13, after control circuit is connected into the circuit.

The control current controls the transistor *p*4 completely, so that the tap point of the potentiometer *r*9 is connected to the lower end of the load capacitor C5 via the diode *n*13. The potential at the tap point of the potentiometer *r*9 is therefore far below the magnitude required for a complete, fully advanced control of the double base diode *p*3. The firing angle is thus determined substantially only through the resistor *r*11.

Figure 2A:
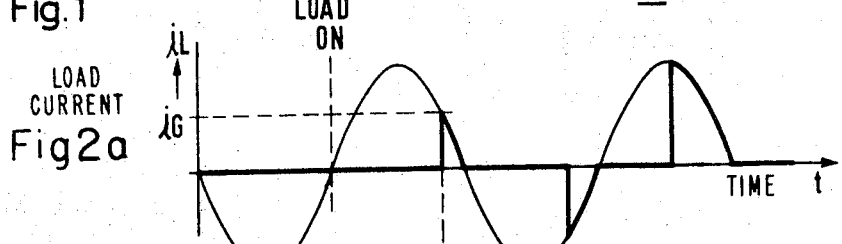
FIG. 2a is a graphical presentation of the load current.
Figure 2B:
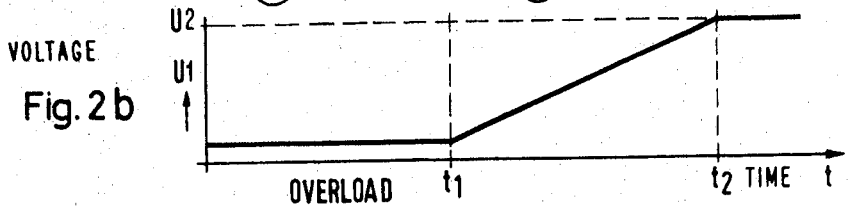
FIG. 2b is a graphical presentation of the voltage at different points of the circuit of FIG. 1.

A fraction of the current which flows in the load circuit and which is determined by the ratio of the primary to the secondary windings of the current transformer *t*1, is supplied via the rectifier *n*6, *n*7 to the storage capacitor C2 and charges said storage capacitor at the indicated polarity. As soon as the load current *i*L exceeds a specific threshold level *i*G, which is the time $t_1$ in FIGS. 2*a* and 2*b*, the difference between the sum of the voltages at the capacitors C1 and C2 and the voltage drop at the resistor *r*3 exceeds the magnitude of the Zener voltage of the Zener diode *n*5. An additional current then flows through the resistor *r*3 and causes a decrease in the control current supplied to the transistor *p*4 via said resistor.

The decrease in current via the control path of the transistor *p*4 is linearized by the charging of the capacitor C4 which occurs simultaneously. Consequently, the voltage U1 increases at the emitter-collector path of the transistor *p*4, so that the load capacitor C5 may be charged in the next-successive half wave of the alternating voltage, to such higher magnitude, at a shorter time constant. That is, the load capacitor C5 may be charged faster, so that the firing voltage of the double base diode *p*3 is reached sooner. This corresponds to a higher load current in the next half wave, of which one portion is utilized for additional or further fully advanced control of the transistor *p*4, via the secondary winding *t*12 of the current transformer *t*1, the Zener diode *n*5 and the diode *n*13.

The voltage U1 (FIGS. 2*a* and 2*b*) accordingly increases linearly with time, at the emitter-collector path of the transistor *p*4, after the control unit S*t* is switched into the circuit, until said voltage, together with the threshold level of the diode *n*14, during the time period $t_2$ (FIG. 2*b*), attains the magnitude of the voltage U2, adjusted at the voltage divider *r*8, *r*9, *r*10. A further increase of this voltage no longer produces a change in the firing angle, since the diode *n*14 is then switched to a nonconductive or blocking condition, so that the firing angle is determined only by the adjusted datum value $U2$.

Figure 3A:
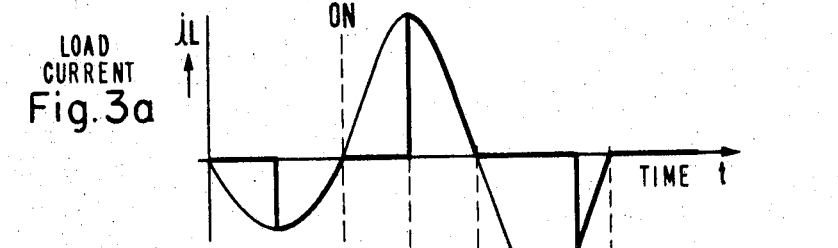
FIG. 3a is a graphical presentation of the load current.
Figure 3B:
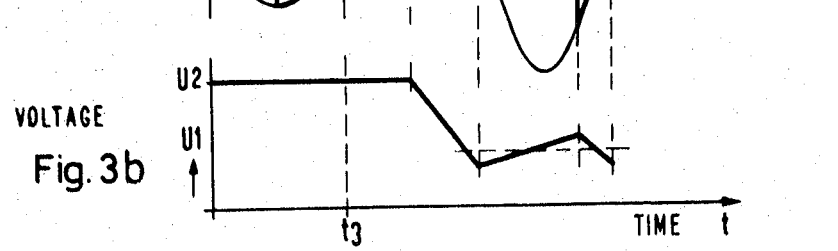
FIG. 3b is a graphical presentation of the voltage at another point of the circuit of FIG. 1.

The circuit arrangement of our invention may also be utilized, through a negligible additional output, to limit the load current to a specific maximum level. As soon as the load current $iL$ exceeds a soon level determined by the transformer ratio of the current transformer $t1$, as well as the threshold level of the Zener diode $n10$, indicated by the time $t_3$ of FIGS. 3a and 3b, said Zener diode is switched to its conductive condition and the capacitor C3 is charged gradually until the threshold level of the Zener diode $n11$ is also attained and said capacitor C3 may discharge via the Zener diode $n11$, the diode $n12$ and the control path of the transistor $p4$. As hereinbefore described, the subsequent fully advanced control of the transistor $p4$ results in a decrease of the effective datum value voltage $U2$, and therefore in an increased firing angle, as well as in a decrease of current.

If the resultant load current still exceeds the threshold level, during the subsequent half wave, an even higher current is delivered to the control path of the transistor $p4$ which even further enlarges the firing angle. If, however, the load current is below the threshold level in the subsequent half wave, the fully advanced control, in accordance with the discharge of the capacitor C3, is terminated via the resistors $r4$ and $r5$. The firing angle is then again shifted to the value determined by the potentiometer $r9$, by the voltage $U2$.

While the invention has been described by means of a specific example and in a specific embodiment, we do not wish to be limited thereto, for obvious modifications will occur to those skilled in the art, without departing from the spirit and scope of the invention.

We claim:

1. An AC controller for connecting a load to an AC voltage source (R,S), said controller having a control unit for providing output control pulses in synchronism with the voltage of said AC voltage source, a resistance capacitance circuit connected to said control unit having a load capacitor (C5) and a load resistor ($r11$) connected in series circuit arrangement for controlling the phase position of said control pulses in accordance with the time constant of said resistance capacitance circuit, said AC controller comprising:

a first diode ($n15$);

a second diode ($n14$);

a transistor ($p2$) having emitter, collector and base electrodes, an emitter-collector path and a base-emitter control path;

a voltage divider having a variable portion connected in parallel with the load capacitor via said first diode and connected to the emitter-collector path of said transistor via said second diode, said first and second diodes having polarities which are such that a current may flow from the voltage divider to said load capacitor and to said transistor;

a resistor ($r3$);

a DC voltage source (C1, $n4$);

a third decoupling diode ($n13$) having a forward conducting polarity connected in series with said resistor between said DC voltage source and the control path of said transistor for providing the control current of said transistor, said resistor having a resistance value which is such that when said DC voltage source is connected in the circuit said transistor is fully controlled, said load resistor having a resistance value which is such that a phase shift between said control pulses and the zero passages of the alternating voltage of said AC voltage source has a maximum magnitude independent of the adjustment of said voltage divider;

a Zener diode ($n5$);

a storage capacitor (C2) connected in series circuit arrangement with said Zener diode, said series circuit arrangement being connected in parallel with said third diode and with the control path of said transistor;

a load;

a current transformer ($t1$) having a primary winding ($t11$) coupled between the load and said AC voltage source and a secondary winding ($t12$); and a rectifier ($n6$, $n7$) coupling said storage capacitor to the secondary winding of said current transformer, said rectifier and said Zener diode having polarities which are such and said Zener diode having polarities which are such and said Zener diode being so rated that the control current supplied by said DC voltage source to said transistor decreases when a specific magnitude of the alternating current flowing through the load is exceeded.

2. An AC controller as claimed in claim 1, wherein said transistor has a base-collector path, and further comprising an additional capacitor (C4) connected in parallel with the base-collector path of said transistor.

3. An AC controller as claimed in claim 1, further comprising an additional rectifier ($n8$,$n9$) coupled to the secondary winding of said current transformer, an additional decoupling diode ($n12$) and a threshold member ($n11$) coupling the control path of said transistor to said additional rectifier, said rectifier having polarities which are such that it provides a current through the control path of said transistor when the current through said load exceeds a threshold level determined by said threshold member.

FO-1050
(5/69)

UNITED STATES PATENT OFFICE
CERTIFICATE OF CORRECTION

Patent No. 3,571,696           Dated March 23, 1971

Inventor(s) MANFRED LISKA and AUBERT MARTIN

It is certified that error appears in the above-identified patent and that said Letters Patent are hereby corrected as shown below:

Application Filed: November 18, 1969

Priority Date: November 25, 1968

Signed and sealed this 25th day of January 1972.

(SEAL)
Attest:

EDWARD M. FLETCHER, JR.      ROBERT GOTTSCHALK
Attesting Officer            Commissioner of Patents